US012006670B2

(12) United States Patent
Cipriani et al.

(10) Patent No.: US 12,006,670 B2
(45) Date of Patent: Jun. 11, 2024

(54) VESSEL RINSING APPARATUS

(71) Applicant: Delta Faucet Company, Indianapolis, IN (US)

(72) Inventors: Mark Cipriani, Carmel, IN (US); Anthony Joseph Tentler, Windfall, IN (US); Jack William Judge, Indianapolis, IN (US); Thad J. Eads, Urbana, IN (US); Michael Scot Rosko, Greenwood, IN (US); Raoul J. Labrie, Shelbyville, IN (US); Alejandra Lazarini, Carmel, IN (US); Michael J. Veros, Carmel, IN (US)

(73) Assignee: Delta Faucet Company, Indianapolis, IN (US)

( * ) Notice: Subject to any disclaimer, the term of this patent is extended or adjusted under 35 U.S.C. 154(b) by 0 days.

(21) Appl. No.: 18/233,846

(22) Filed: Aug. 14, 2023

(65) Prior Publication Data

US 2023/0399828 A1 Dec. 14, 2023

Related U.S. Application Data

(63) Continuation of application No. 17/890,526, filed on Aug. 18, 2022, now Pat. No. 11,725,369, which is a (Continued)

(51) Int. Cl.

| | |
|---|---|
| ***E03C 1/04*** | (2006.01) |
| *B05B 1/28* | (2006.01) |

(Continued)

(52) U.S. Cl.
CPC .............. *E03C 1/0404* (2013.01); *B05B 1/28* (2013.01); *B05B 12/002* (2013.01); *B08B 9/34* (2013.01)

(58) Field of Classification Search
None
See application file for complete search history.

(56) References Cited

U.S. PATENT DOCUMENTS

| | | | |
|---|---|---|---|
| 708,844 | A | 9/1902 | Sweeney |
| 737,247 | A | 8/1903 | Kammerer |

(Continued)

FOREIGN PATENT DOCUMENTS

| | | |
|---|---|---|
| BE | 896360 | 8/1983 |
| BE | 1025325 B1 | 1/2019 |

(Continued)

OTHER PUBLICATIONS

United States Patent and Trademark Office, Before the Patent Trial and Appeal Board, Petition for Inter Partes Review, U.S. Pat. No. 11,473,277, *Wenzhou Xin Xin Sanitary Ware Co., Ltd.* V. *Delta Faucet Company*, filed Aug. 16, 2023, IPR2023-01332, 82 pages.

(Continued)

*Primary Examiner* — Cristi J Tate-Sims
(74) *Attorney, Agent, or Firm* — Bose McKinney & Evans LLP

(57) ABSTRACT

A vessel rinsing apparatus including a mounting base, a fluid discharge member including a plurality of nozzles, a valve member operably coupled to the fluid discharge member and configured to control water flow through the nozzles, and an escutcheon supported by the mounting base.

30 Claims, 12 Drawing Sheets

Related U.S. Application Data continuation of application No. 17/167,647, filed on Feb. 4, 2021, now Pat. No. 11,473,277, which is a continuation of application No. 16/131,035, filed on Sep. 14, 2018, now Pat. No. 10,914,056.

(51) Int. Cl.
*B05B 12/00* (2018.01)
*B08B 9/34* (2006.01)

(56) References Cited

U.S. PATENT DOCUMENTS

| | | | | |
|---|---|---|---|---|
| 784,755 | A * | 3/1905 | Pein | A47L 15/14 134/44 |
| 3,092,120 | A | 6/1963 | Hilger et al. | |
| 6,152,381 | A | 11/2000 | Hones | |
| 6,612,507 | B1 | 9/2003 | Meyer et al. | |
| 8,646,476 | B2 | 2/2014 | Thomas et al. | |
| 8,684,047 | B2 | 4/2014 | Hotaling | |
| 10,914,056 | B2 | 2/2021 | Cipriani et al. | |
| 11,473,277 | B2 | 10/2022 | Cipriani et al. | |
| 11,725,369 | B2 | 8/2023 | Cipriani et al. | |
| 2004/0060109 | A1 | 4/2004 | Hensley | |
| 2004/0168711 | A1 | 9/2004 | Dickson, Jr. et al. | |
| 2008/0142095 | A1* | 6/2008 | Van Der Linden | A47L 15/0065 137/560 |
| 2011/0061754 | A1* | 3/2011 | Thomas | E03C 1/048 137/625.29 |
| 2012/0204342 | A1 | 8/2012 | Hotaling | |
| 2014/0215709 | A1 | 8/2014 | Nightlinger et al. | |
| 2014/0283877 | A1 | 9/2014 | Sonoda | |
| 2016/0324395 | A1 | 11/2016 | Cox et al. | |
| 2017/0162427 | A1 | 6/2017 | Gleissner et al. | |
| 2017/0172369 | A1 | 6/2017 | Gonzalez et al. | |
| 2018/0092505 | A1 | 4/2018 | Simon | |
| 2020/0087899 | A1 | 3/2020 | Cipriani et al. | |
| 2021/0052131 | A1 | 2/2021 | Cipriani et al. | |
| 2021/0156125 | A1 | 5/2021 | Cipriani et al. | |
| 2022/0389693 | A1 | 12/2022 | Cipriani et al. | |

FOREIGN PATENT DOCUMENTS

| | | | |
|---|---|---|---|
| CN | 86102485 | | 11/1986 |
| CN | 2260567 | Y | 8/1997 |
| CN | 101035735 | | 9/2007 |
| CN | 203281567 | U | 11/2013 |
| CN | 203750946 | U | 8/2014 |
| CN | 106572780 | | 4/2017 |
| CN | 206779097 | U | 12/2017 |
| CN | 108015069 | A | 5/2018 |
| DE | 3628724 | | 2/1988 |
| DE | 202007015486 | | 3/2009 |
| FR | 624156 | | 7/1927 |
| FR | 2543426 | | 5/1984 |
| FR | 2606622 | | 5/1988 |
| FR | 2704782 | | 11/1994 |
| GB | 262372 | | 12/1926 |
| GB | 264756 | | 1/1927 |
| KR | 101765550 | | 8/2017 |
| NL | 1033004 | C2 | 6/2008 |
| WO | 2012108735 | A2 | 8/2012 |
| WO | 2015107560 | A1 | 7/2015 |

OTHER PUBLICATIONS

United States Patent and Trademark Office, Before the Patent Trial and Appeal Board, Notice of Filing Date Accorded to Petition and Time for Filing Patent Owner Preliminary Response, U.S. Pat. No. 11,473,277, *Wenzhou Xin Xin Sanitary Ware Co., Ltd.* V. *Delta Faucet Company*, filed Aug. 16, 2023, IPR2023-01332, 6 pages.

United States Patent and Trademark Office, Before the Patent Trial and Appeal Board, Patent Owner's Mandatory Notices, U.S. Pat. No. 11,473,277, *Wenzhou Xin Xin Sanitary Ware Co.* v. *Delta Faucet Company, Ltd.*, filed Sep. 6, 2023, IPR2023-01332, 5 pages.

United States Patent and Trademark Office, Before the Patent Trial and Appeal Board, Exhibit List, U.S. Pat. No. 11,473,277, *Wenzhou Xin Xin Sanitary Ware Co.* v. *Delta Faucet Company, Ltd.*, filed Aug. 16, 2023, IPR2023-01332, 2 pages.

United States Patent and Trademark Office, Before the Patent Trial and Appeal Board, Declaration of J. Chris Cook, U.S. Pat. No. 11,473,277, *Wenzhou Xin Xin Sanitary Ware Co.* v. *Delta Faucet Company, Ltd.*, filed Aug. 16, 2023, IPR2023-01332, 102 pages.

United States Patent and Trademark Office, Before the Patent Trial and Appeal Board, U.S. Pat. No. 10,914,056, filed Aug. 16, 2023, IPR2023-01332, 174 pages.

United States Patent and Trademark Office, Before the Patent Trial and Appeal Board, U.S. Pat. No. 11,473,277, filed Aug. 16, IPR2023-01332, 372 pages.

In the United States District Court for the District of New Jersey, Original Complaint, *Wenzhou Xin Xin Sanitary Ware Co., Ltd.* V. *Delta Faucet Company*, filed Apr. 11, 2023, IPR2023-01332, 9 pages.

In the United States District Court for the District of New Jersey, Answer, Affirmative, Defense, and Counterclaims, Jury Trial Demand, *Wenzhou Xin Xin Sanitary Ware Co., Ltd.* v. *Delta Faucet Company*, filed Jul. 28, 2023, IPR2023-01332, 48 pages.

United States Patent and Trademark Office, Before the Patent Trial and Appeal Board, Decision Denying Institution of Inter Partes Review, U.S. Pat. No. 11,473,277, *Wenzhou Xin Xin Sanitary Ware Co., Ltd.* v. *Delta Faucet Company*, Feb. 7, 2024, IPR2023-01332, 41 pages.

Aluids, The Original Rinser, C4400, retrieved from www.aluids.com/product/the-original-rinser-glass-rinser-for-kitchen-sinks/ on Oct. 17, 2023, 2 pages.

Aluids, The Original Rinser, C4400-v2, retrieved from www.aluids.com/product/the-original-rinser-glass-rinser-for-kitchen-sinks/ on Oct. 17, 2023, 2 pages.

Aluids, The Original Rinser—for every corner of your drinkware, retrieved from www.aluids.com/the-original-rinser/ on Nov. 16, 2023, 20 pages.

In the United States District Court for the Southern District of Indiana, Defendant's Answer, *Delta Faucet Company* v. *Wenzhou Xin Xin Sanitary Ware Co. Ltd.*, filed Apr. 11, 2024, Civil Action No. 1:23-cv-01633-MPB-TAB, 15 pages.

* cited by examiner

VESSEL RINSING APPARATUS

CROSS-REFERENCE TO RELATED APPLICATION

The present application is a continuation of U.S. patent application Ser. No. 17/890,526, filed Aug. 18, 2022, which is a continuation of U.S. patent application Ser. No. 17/167,647, filed Feb. 4, 2021 (now U.S. Pat. No. 11,473,277), which is a continuation of U.S. patent application Ser. No. 16/131,035, filed Sep. 14, 2018 (now U.S. Pat. No. 10,914,056), the disclosures of which are expressly incorporated herein by reference

BACKGROUND AND SUMMARY OF THE DISCLOSURE

The present invention related generally to a fluid dispensing system and, more particularly, to a vessel rinsing apparatus for use with fluid vessels or receptacles, such as cups or glasses.

The interior of glasses, cups, and other small vessels or containers are often difficult to clean by removing dirt and debris after use. Conventional bottle brushes, sponges, rags and other disposable materials are often used to clean such small vessels but may not be effective, for example, as being incapable of fitting inside the vessel, and do not provide water for rinsing. In addition, typical faucets lack directional pressurized water flow required to adequately remove dirt and debris from extremities within the interiors of small vessels.

There remains a need for a vessel rinsing apparatus capable of being installed in a standard countertop opening, or integrated as part of a faucet escutcheon, which allows for the cleaning of small vessels, such as glasses and cups.

According to an illustrative embodiment of the present disclosure, a vessel rising apparatus includes a mounting base having an upper coupler and a downwardly extending mounting shank defining an opening extending along a longitudinal axis. The upper coupler is configured to be supported above an upper surface of a mounting deck, and the mounting shank is configured to extend through a mounting aperture formed within the mounting deck. A fluid discharge member includes a central body supporting a plurality of nozzles and a trigger extending outwardly from the central body. The central body is received with the opening of the mounting shank and is moveable along the longitudinal axis. A valve shaft is operably coupled to the fluid discharge member and is configured to move with the trigger to control water flow through the central body to the plurality of nozzles. An escutcheon is supported by the upper coupler of the mounting base and includes an upwardly extending wall defining a drain bowl, and a drain channel extending through the upwardly extending wall. The drain channel is configured to provide fluid communication between the drain bowl and a sink basin supported by the mounting deck.

According to another illustrative embodiment of the present disclosure, a vessel rinsing apparatus includes a mounting base having a downwardly extending mounting shank defining an opening extending along a longitudinal axis. The mounting shank is configured to extend through a mounting aperture formed within a mounting deck. A fluid discharge member includes a central body supporting a plurality of nozzles and a trigger extending outwardly from the central body. The central body is received within the opening of the mounting shank and is moveable along the longitudinal axis.

A valve shaft is operably coupled to the fluid discharge member and is configured to move with the trigger to control water flow through the central body to the plurality of nozzles. A removable plate is supported by the trigger of the fluid discharge member. The removable plate includes one of a strainer having a base and a plurality circumferentially spaced drain openings, and an elastomeric brush having a plurality of upwardly extending cleaning projections and a plurality of drain openings positioned intermediate adjacent ones of the cleaning projections.

According to further illustrative embodiment of the present disclosure, a vessel rinsing apparatus includes a mounting base having an upper plate and a downwardly extending mounting shank defining an opening extending along a longitudinal axis, the upper plate configured to be supported above an upper surface of the mounting deck, and the mounting shank configured to extend through a mounting aperture formed within the mounting deck. A fluid discharge member includes a central body supporting a plurality of nozzles and a trigger extending outwardly from the central body. The central body is received within the opening of the mounting shank and is moveable along the longitudinal axis. A valve shaft is operably coupled to the fluid discharge member and is configured to move with the trigger to control water flow through the central body to the plurality of nozzles. An escutcheon is supported by the mounting base and includes an upwardly extending wall and a drain channel extending through the upwardly extended wall, wherein the upper plate of the mounting face and the upwardly extending wall of the escutcheon define a drain bowl. The drain channel is configured to provide fluid communication between the drain bowl and a sink basin supported by the mounting deck. A removable plate is supported by the trigger of the fluid discharge member.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

Figure 1:
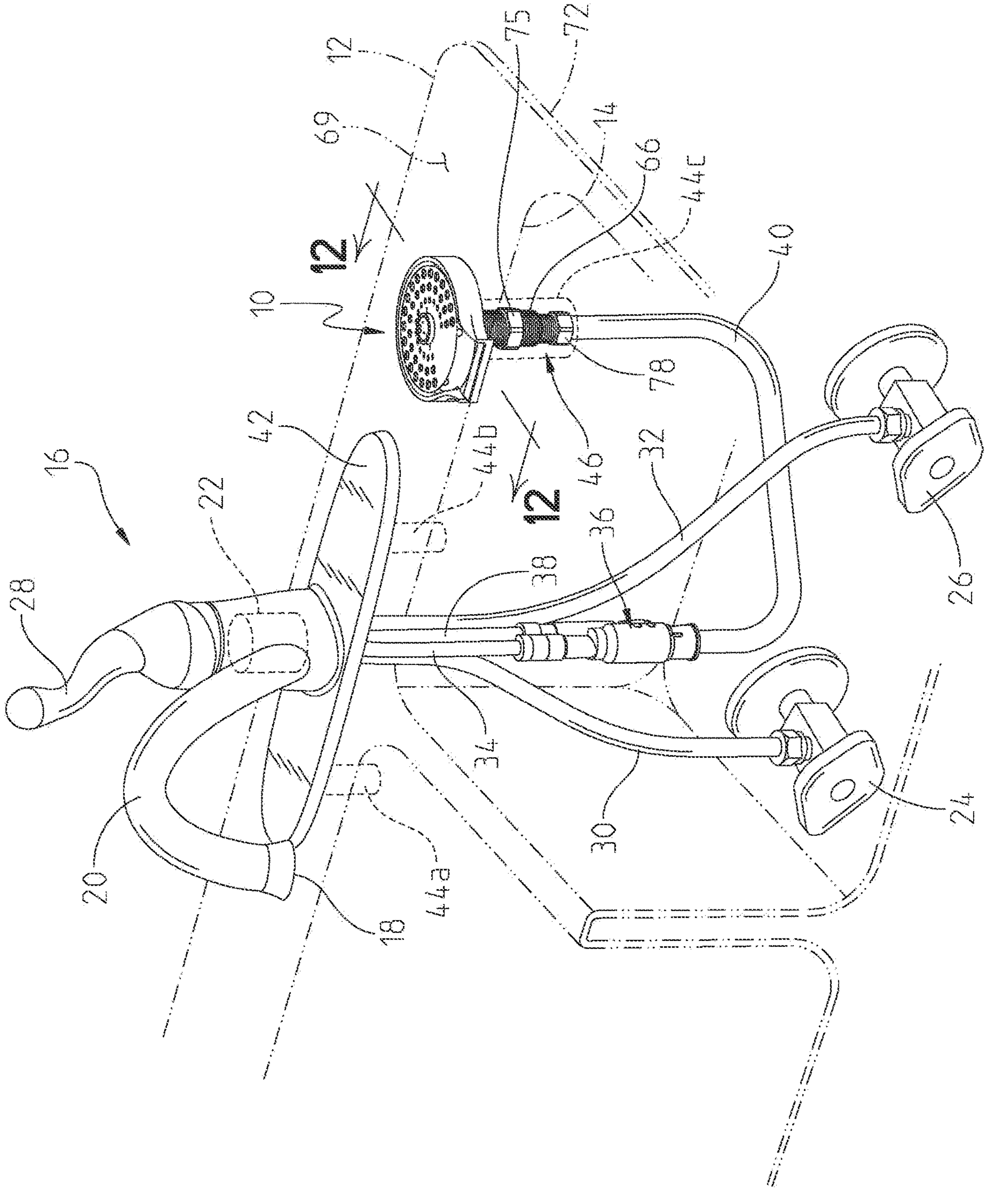
FIG. 1 is a perspective view of an illustrative vessel rinsing apparatus mounted to a sink deck and fluidly coupled to a faucet.

For the purposes of promoting an understanding of the principles of the present disclosure, reference will now be made to the embodiments illustrated in the drawings, which are described herein. The embodiments disclosed herein are not intended to be exhaustive or to limit the invention to the precise form disclosed. Rather, the embodiments are chosen and described so that others skilled in the art may utilize their teachings. Therefore, no limitation of the scope of the claimed invention is thereby intended. The present invention includes any alterations and further modifications of the illustrated devices and described methods and further applications of principles in the invention which would normally occur to one skilled in the art to which the invention relates.

Figure 2:
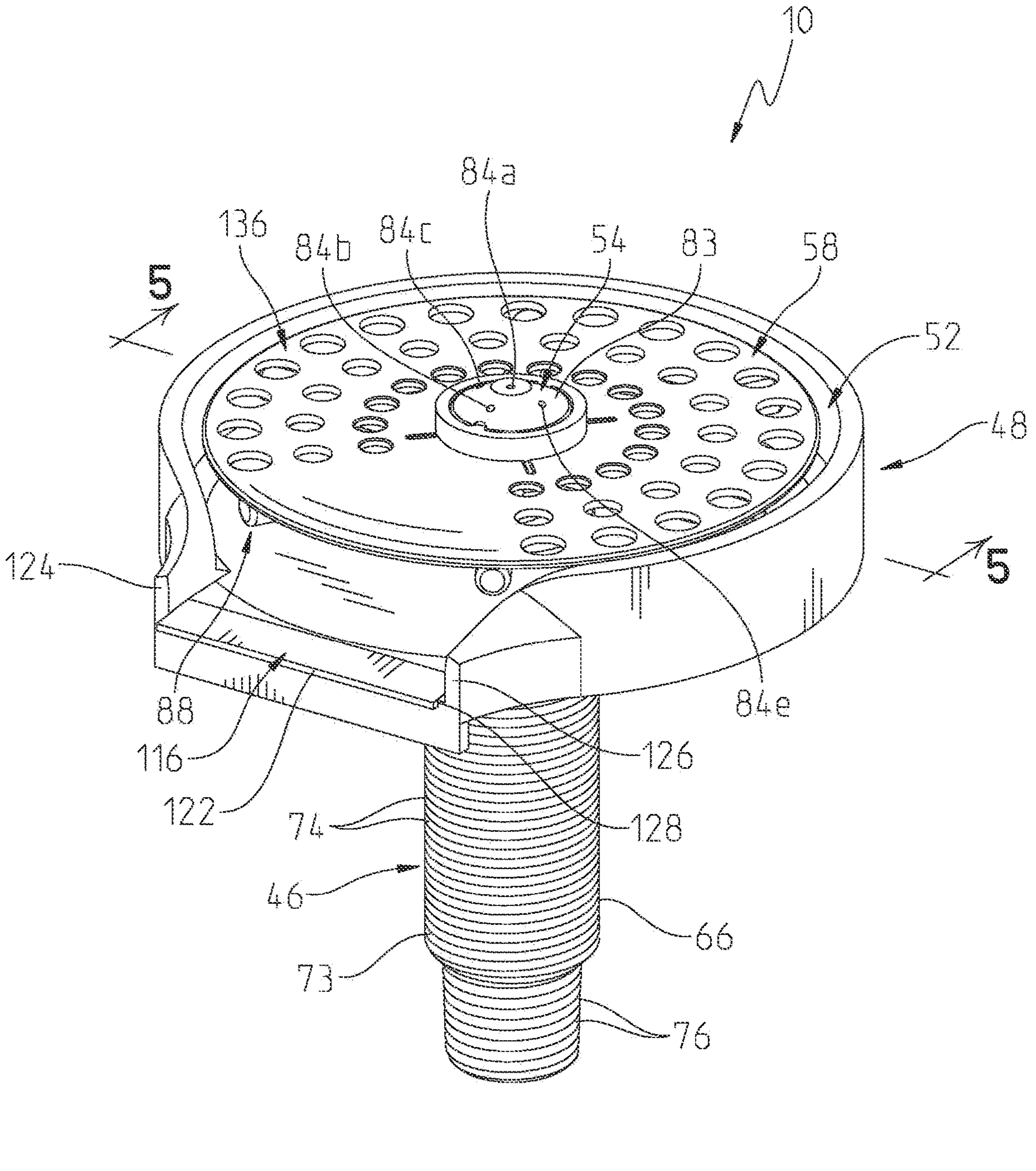
FIG. 2 is a perspective view of the vessel rinsing apparatus of FIG. 1.

With reference initially to FIGS. 1 and 2, an illustrative vessel rinsing apparatus 10 is shown supported by a conventional mounting deck, such as a sink deck 12 supporting a sink basin 14. A faucet 16 may be supported by the sink deck 12 for discharging water from a water outlet 18 into the sink basin 14. The faucet 16 may be of conventional design, including a delivery spout 20 defining the water outlet 18, and a manual mixing valve 22 for controlling water flow from a hot water supply 24 and a cold water supply 26 to the water outlet 18. The mixing valve 22 includes a valve handle 28 to control the flow rate and the temperature of water delivered to the water outlet 18. A hot water supply tube 30 may fluidly couple the hot water supply 24 to a first inlet of the mixing valve 22, and a cold water supply tube 32 may fluidly couple the cold water supply 26 to a second inlet of the mixing valve 22. A mixed water outlet tube 34 may fluidly couple an outlet of the mixing valve 22 a diverter valve 36.

The diverter valve 36 illustratively controls (e.g., toggles) water flow between the outlet 18 of the delivery spout 20 and the vessel rinsing apparatus 10. An illustrative diverter valve 36 is detailed in U.S. Pat. No. 8,646,476, the disclosure of which is expressly incorporated by herein by reference. A spout outlet tube 38 fluidly couples the diverter valve 36 to the outlet 18, while a dispenser tube 40 fluidly couples the diverter valve 36 to the vessel rinsing apparatus 10. As such, the mixing valve 22 may be manipulated by the handle 28 to control the temperature and flow rate of water delivered to the active outlet(s) selected by the diverter valve 36 (e.g., the delivery spout outlet 18 and the glass rinsing apparatus 10). The various water tubes 32, 34, 38 and 40 may be formed of a flexible polymer, such as a cross-linked polyethylene (PEX).

An escutcheon 42 may be positioned intermediate the sink deck 12 and the delivery spout 20. A plurality of mounting apertures 44 may extend within the sink deck 12, wherein at least some of the apertures 44*a*, 44*b* may be used to couple the faucet 16 to the sink deck 12. In the illustrative embodiment, the glass rinsing apparatus 10 is fixed to the mounting aperture 44*c* that would conventionally support a kitchen side sprayer (not shown) adjacent the sink basin 14. Such positioning facilitates draining of the vessel rinsing apparatus 10 into the sink basin 14.

Figure 3:
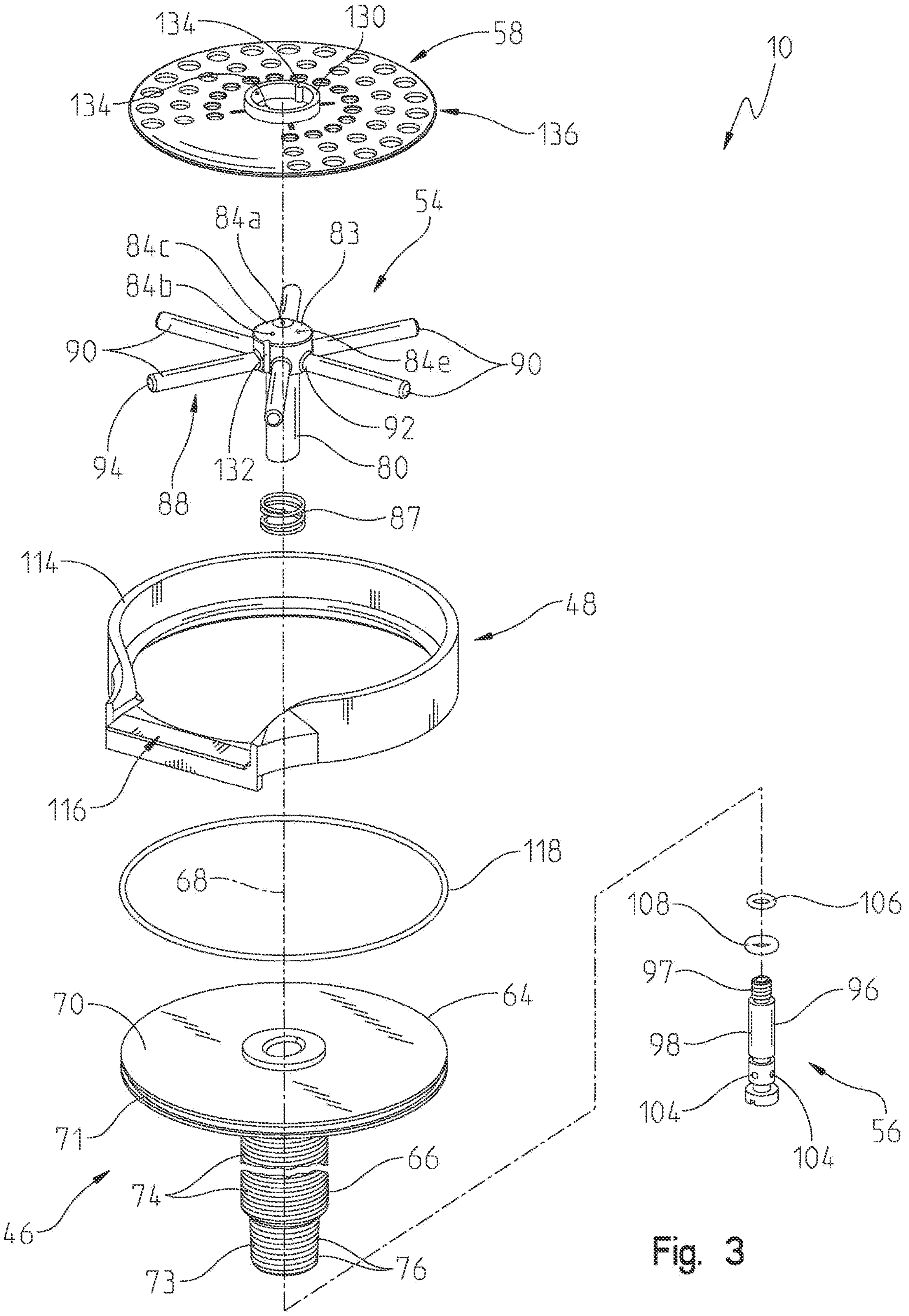
FIG. 3 is a top exploded perspective view of the vessel rinsing apparatus of FIG. 2.
Figure 4:
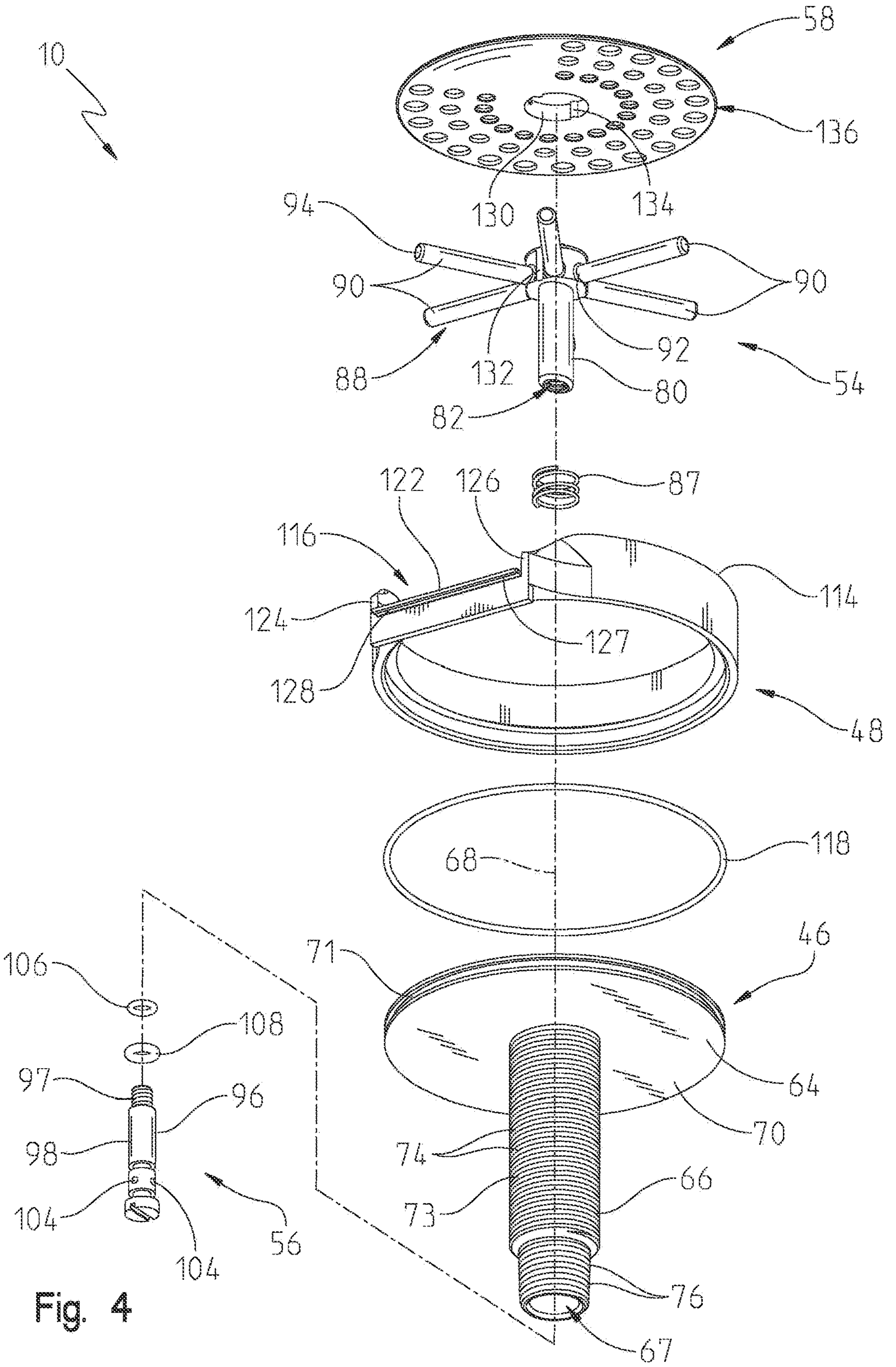
FIG. 4 is a bottom exploded perspective view of the vessel rinsing apparatus of FIG. 2.
Figure 5:
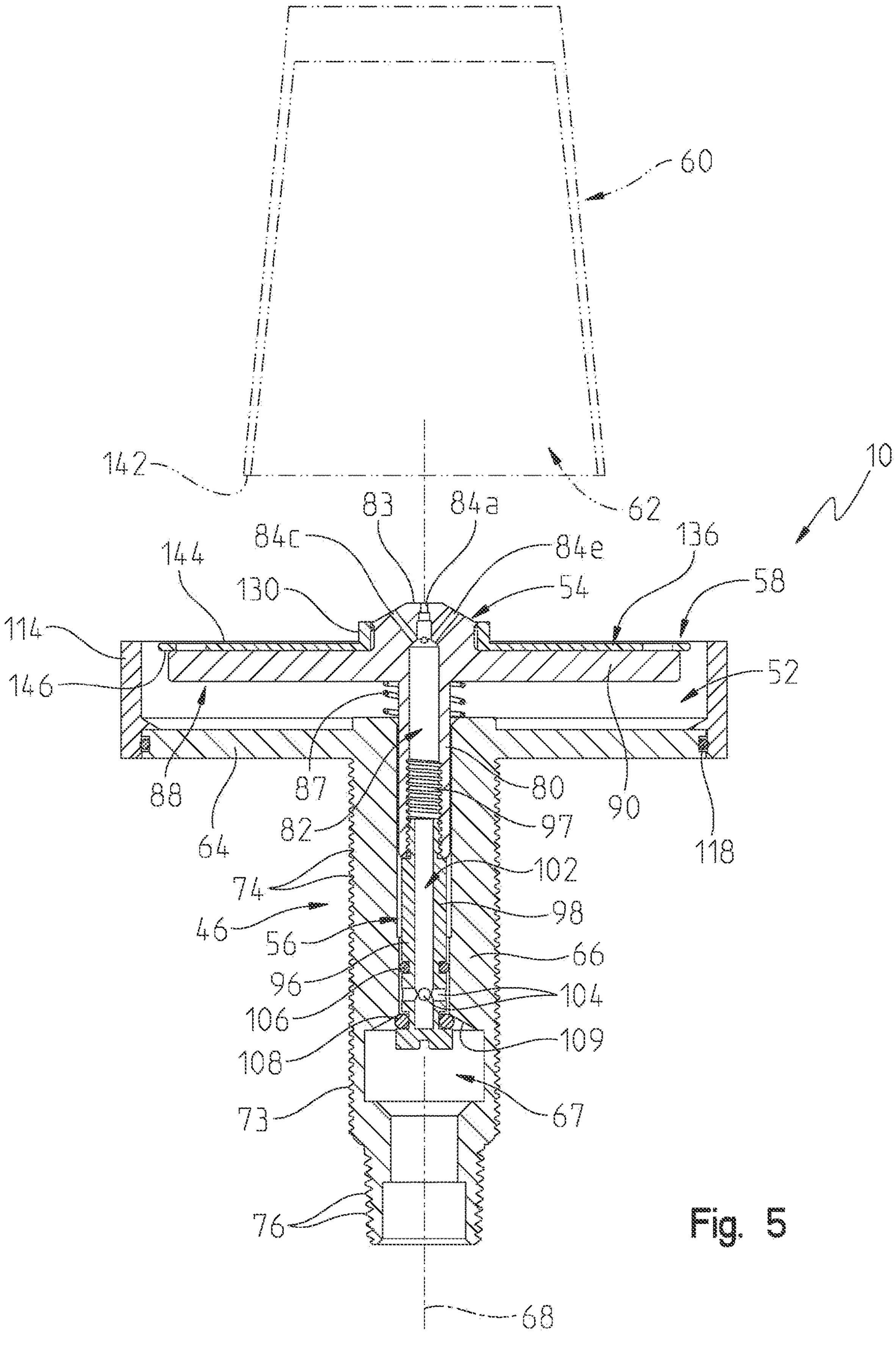
FIG. 5 is a cross-sectional view of the vessel rinsing apparatus taken along line 55 of FIG. 2, showing the discharge member in a closed position and a vessel shown in phantom.

With reference to FIGS. 2-4, the illustrative vessel rinsing apparatus 10 includes a mounting base 46 configured to be coupled to the sink deck 12. An escutcheon 48 illustratively cooperates with the mounting base 46 to define a contoured drain receptacle or bowl 52 for the collection and disposal of debris and wastewater. A fluid discharge member 54 is operably coupled to the mounting base 46 and to a valve member 56. A trigger plate 58 is supported by the fluid discharge member 54 and is configured to be engaged by a vessel 60 (e.g., a cup, glass or other container) for activating water flow through the fluid discharge member 54 and into an interior 62 of the vessel 60 (FIGS. 5 and 6).

The mounting base 46 illustratively includes an upper coupler, such as an upper plate 64, and a downwardly extending mounting shank 66 defining an opening 67 extending along a longitudinal axis 68. The upper plate 64 is configured to be supported above an upper surface 69 of the sink deck 12 and illustratively comprises a disk 70 having a circular peripheral edge 71. The mounting shank 66 is configured to extend through one of the mounting apertures 44*c* formed within the sink deck 12 and below a lower surface 72 of the sink deck 12. The mounting shank 66 illustratively includes a stepped cylindrical tube 73 having upper external threads 74 configured to threadably couple with a mounting nut 75 for securing the mounting base 46 to the sink deck 12 (FIG. 1). Illustratively, the dispenser tube 40 is fluidly coupled to the mounting shank 66 to provide water from a water supply (illustratively via the mixing valve 22 through the diverter valve 36). More particularly, the cylindrical tube 73 of the mounting shank 66 illustratively includes lower external threads 76 configured to engage with a fitting 78 to fluidly couple the dispenser tube 40 to the mounting shank 66 (FIG. 1).

With reference to FIGS. 3-6, the fluid discharge member 54 cooperates with the mounting base 50 to deliver water from the dispenser tube 40. The fluid discharge member 54 illustratively includes a central body 80 defining a fluid passageway 82 and having a sprayface 83 supporting a plurality of nozzles 84 in fluid communication with the fluid passageway 82. More particularly, the nozzles 84 may include a center nozzle 84*a* and a plurality of peripheral nozzles 84*b*, 84*c*, 84*d*, 84*e* positioned radially outward from the center nozzle 84*a*. It should be appreciated that the number and placement of the nozzles 84 may vary.

Figure 6:
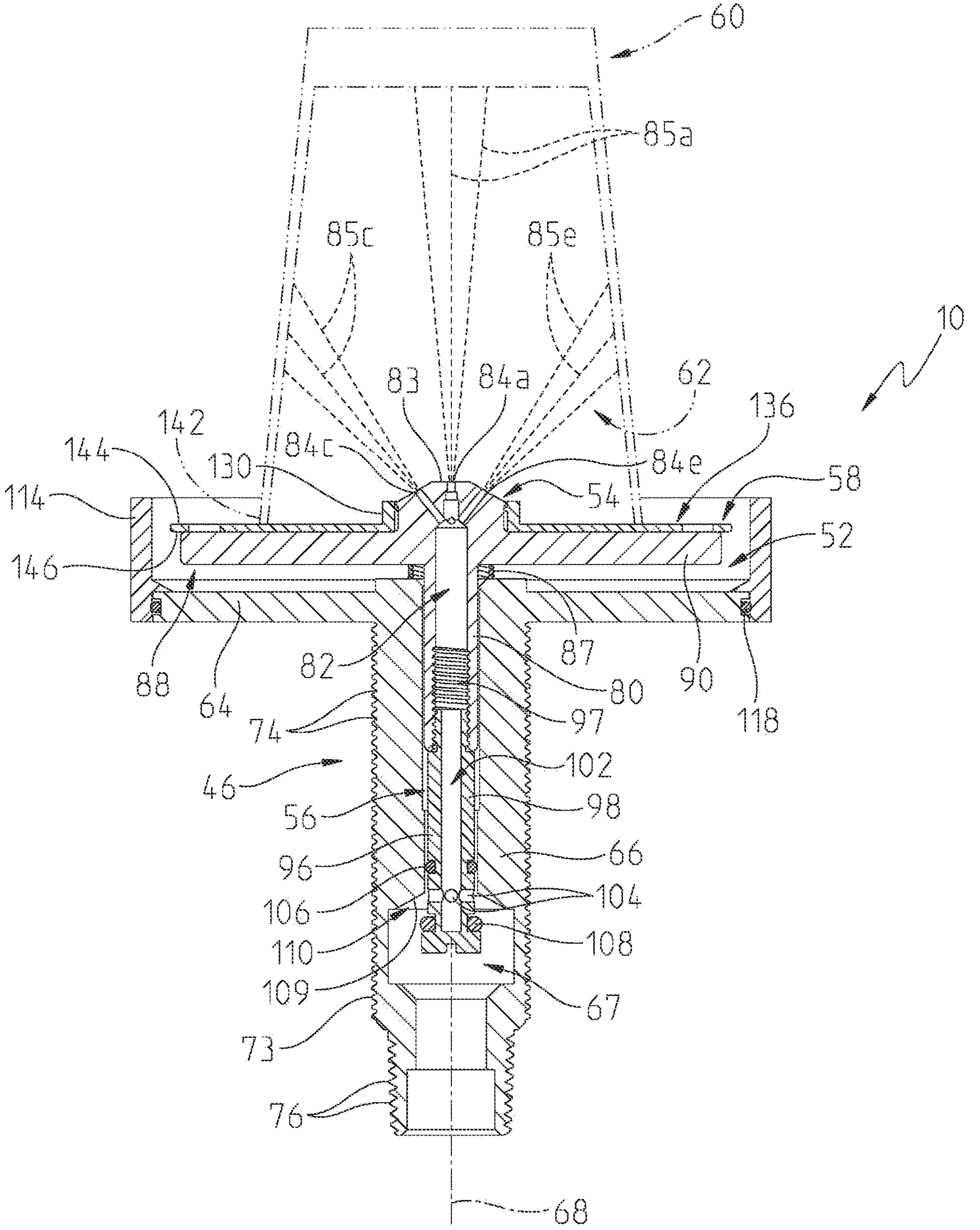
FIG. 6 is a cross-sectional view of the vessel rinsing apparatus similar to FIG. 5, showing the discharge member in an open position and a vessel shown in phantom.

In one illustrative embodiment, the nozzles 84 may be oriented to direct water in different desired positions within an interior 86 of the vessel 60, as represented by arrows 85 in FIG. 6. For example, the center nozzle 84*a* may be configured to discharge water upwardly parallel to the longitudinal axis 68. Illustratively, a first peripheral nozzle 84*b* may be oriented at a first angle from the longitudinal axis 68 for directing water to a distal corner of a mug, a second peripheral nozzle 84*c* may be oriented at a second angle from the longitudinal axis 68 for directing water to a distal corner of a highball glass, a third peripheral nozzle 84*d* may be oriented at a third angle from the longitudinal axis 68 for directing water to a distal corner of a tumbler or pint glass, and a forth peripheral nozzle 84*e* may be oriented at a fourth angle from the longitudinal axis 68 for directing water to a distal portion of a wine glass.

The central body 80 of the fluid discharge member 54 is slideably received within the opening 67 of the mounting shank 66 such that it is moveable along the longitudinal axis 68. More particularly, the fluid discharge member 54 is configured to move along the longitudinal axis 68 between a raised (or rest) position (FIG. 5), and a lowered (or active) position (FIG. 6). A spring 87 may cooperate with the mounting base 46 to bias the discharge member 54 to the upper position. The fluid discharge member 54 may be restrained from rotating relative to the mounting base 50. Illustratively, the central body 80 has an elongated cross section (e.g. oval) thereby preventing rotation within the opening 67. Other rotatable couplers, such as a key received within a keyway, may be substituted therefor.

A trigger 88 extends outwardly from the central body 80, The trigger 88 illustratively includes a plurality of radially outwardly extending arms or posts 90, each having a first end 92 supported by the central body 80 and a freely supported second end 94.

The valve member 56 illustratively comprises a valve pin or shaft 96 operably coupled to the fluid discharge member 54 (e.g., via a threaded coupling 97), and is configured to move with the trigger 88 to control water flow through the central body 80 to the plurality of nozzles 84. More particularly, the valve shaft 96 illustratively includes a hollow body 98 defining a fluid passageway 102 in fluid communication with the fluid passageway 82 of the central body 80 via radial openings 104. Upper and lower o-rings 106 and 108 are positioned above and below openings 104, respectively. The valve member 56 may be a separate component from the fluid discharge member 54, or formed integral therewith.

In the raised position as shown in FIG. 5, the valve shaft 96 blocks water flow from the fluid source (e.g., the mixing valve 22) to the nozzles 84. More particularly, the o-ring 108 seals against a valve seat 109 to prevent water flow from opening 67 to the fluid passageway 102. In the lowered position as shown in FIG. 6, the valve shaft 96 provides fluid communication between the fluid source and the nozzles 84. More particularly, a passageway 110 between the o-ring 108 and the valve seat 109 permits water flow therethrough from opening 67 to fluid passageway 102 through openings 104, and through the fluid passageway 82 to the nozzles 84.

Figure 12:
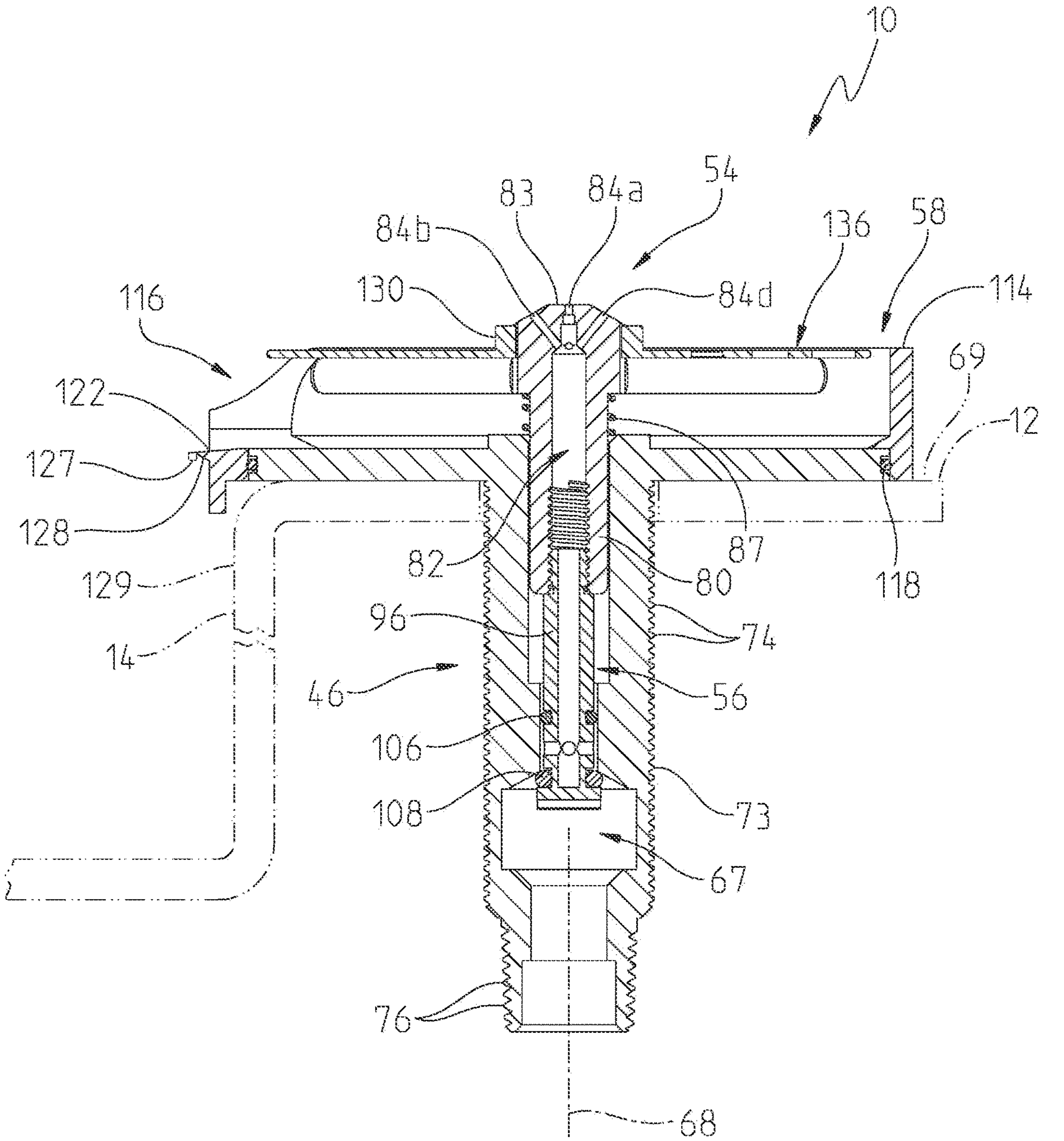
FIG. 12 is a cross-sectional view of the vessel rinsing apparatus taken along line 12-12 of FIG. 1, showing the drain channel in fluid communication with a sink basin.

The escutcheon 48 is supported by the mounting base 50 and illustratively includes an upwardly extending wall 114 and a drain channel 116 extending through the upwardly extending wall 114. As shown in FIGS. 1 and 12, the drain channel 116 is configured to provide fluid communication between the drain bowl 52 and the sink basin 14 supported by the sink deck 12. The upper plate 64 of the mounting base 50 and the upwardly extending wall 114 of the escutcheon 42 illustratively define the drain bowl 52. An o-ring 118 is illustratively supported by the peripheral edge 71 of the upper plate 64 to releasably retain the escutcheon 48 to the mounting base 50. As such, the escutcheon 48 may be exchanged with other escutcheons with different aesthetic shapes, finishes and/or drain channel 116 dimensions.

The drain channel 116 illustratively includes a lower wall 122 and opposing side walls 124 and 126. A lip 127 and an associated undercut 128 formed in a lower surface of the lower wall 122 prevents wastewater flowing through the drain channel 116 from running back toward the rear wall 129 of the sink basin 14. More particularly, the undercut 128 cooperates with the lip 127 to direct water downward.

In an illustrative embodiment, the trigger plate 58 is removably supported by the trigger 88 of the fluid discharge member 54 above the drain bowl 52. More particularly, the removeable trigger plate 58 is illustratively supported by the arms 90 of the trigger 88. Illustratively, a retaining ring 130 concentrically receives and frictionally engages the body 80 to releasably secure the trigger plate 58 to the fluid discharge member 54. The removable trigger plates 58 can be cleaned, replaced and/or exchanged with other trigger plates 58 that may have different cleaning benefits (e.g., characteristics of a brush or sponge).

Anti-rotation members may be configured to prevent rotation of the removeable trigger plate 58 about the longitudinal axis 68 relative to the fluid discharge member 54. The anti-rotation members may comprise a recess 132 supported by the fluid discharge member, and cooperating tabs 134 supported by the removeable trigger plate 58.

Figure 7:
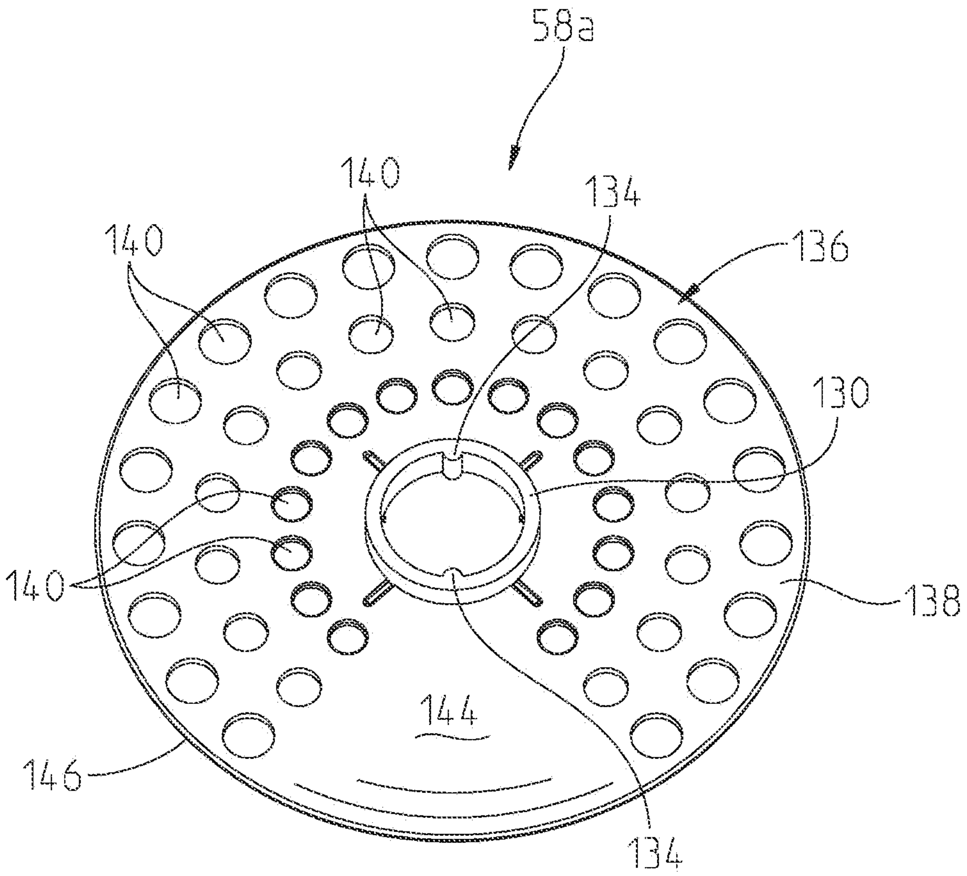
FIG. 7 is a perspective view of a first removable plate of the vessel rinsing apparatus of FIG. 2 in the form of a strainer.

With reference to FIG. 7, a first removeable trigger plate 58*a* may comprise a strainer 136 including a base 138 and a plurality of circumferentially spaced drain openings 140 arranged in a plurality of radially spaced rows. As a rim 142 of the glass 60 contacts the upper surface 144 of the strainer 136, a lower surface 146 of the strainer 136 engages the trigger 88 (FIGS. 5 and 6).

Figure 8:
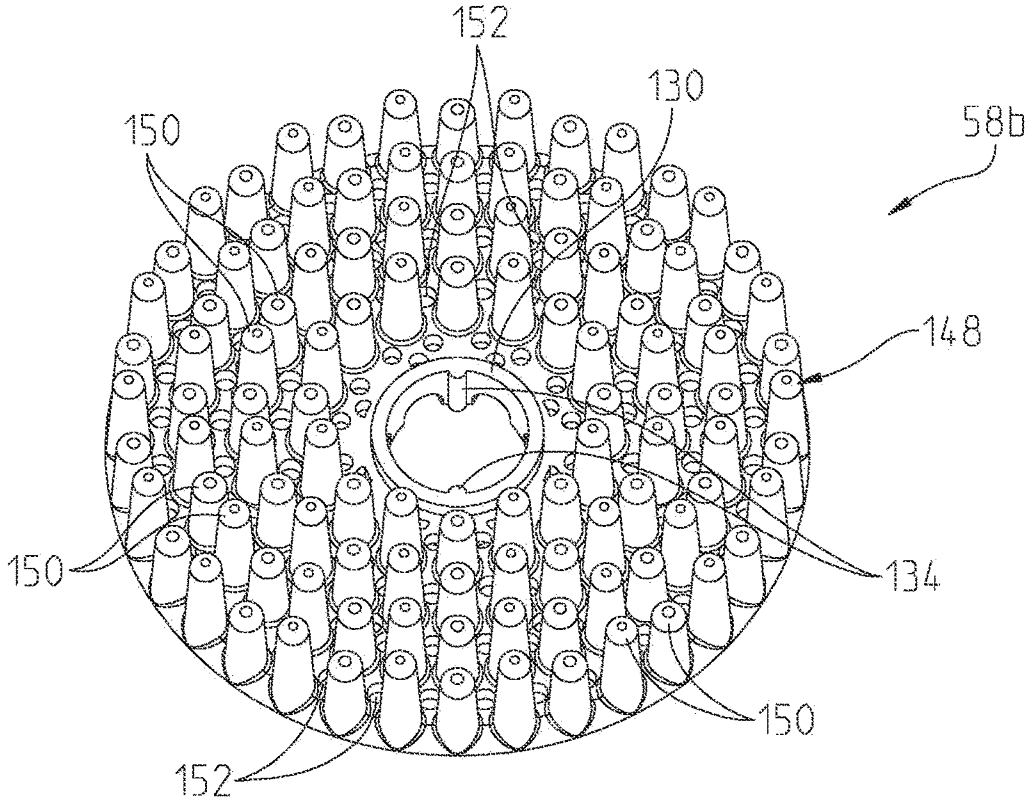
FIG. 8 is a perspective view of a second removable plate of the vessel rinsing apparatus of FIG. 2 in the form of a cleaning brush, with a plurality of first cleaning projections.

As shown in FIG. 8, a second removeable trigger plate 58*b* may comprise an elastomeric brush 148 including a plurality of upwardly extending projections or pegs 150 and a plurality of drain openings 152 positioned intermediate adjacent cleaning projections 150. The rim 142 of the glass 60 is configured to be received between adjacent cleaning projections 150 to assist in cleaning the inner and outer surfaces of the rim 142.

Figure 9:
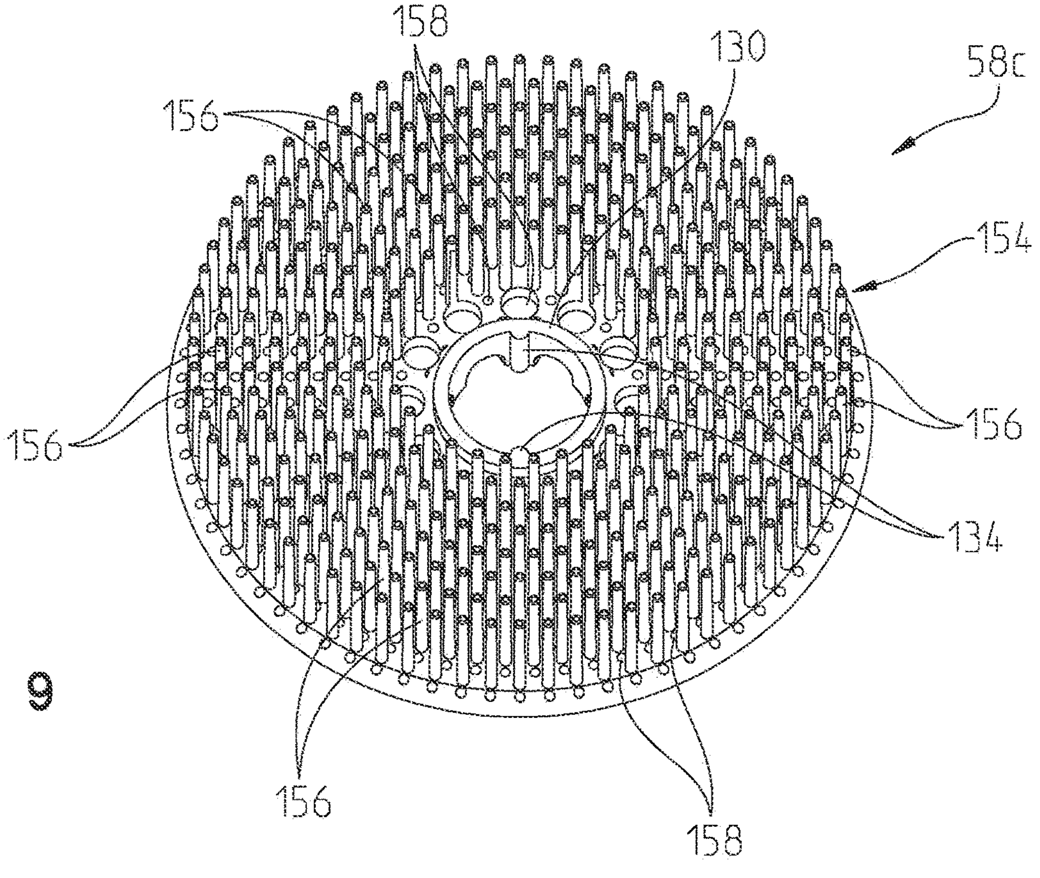
FIG. 9 is a perspective view of a third removable plate of the vessel rinsing apparatus of FIG. 2 in the form of a cleaning brush, with a plurality of second cleaning projections.
Figure 10:
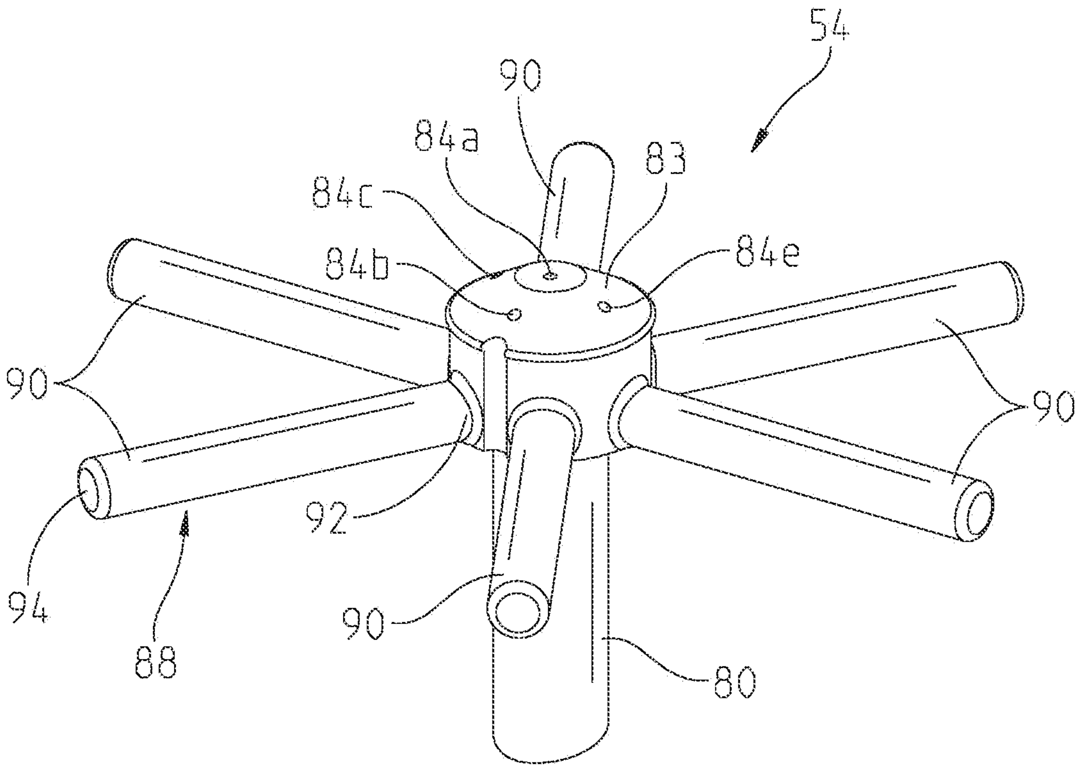
FIG. 10 is a perspective view of a fluid discharge member of the vessel rinsing apparatus of FIG. 2.
Figure 11:
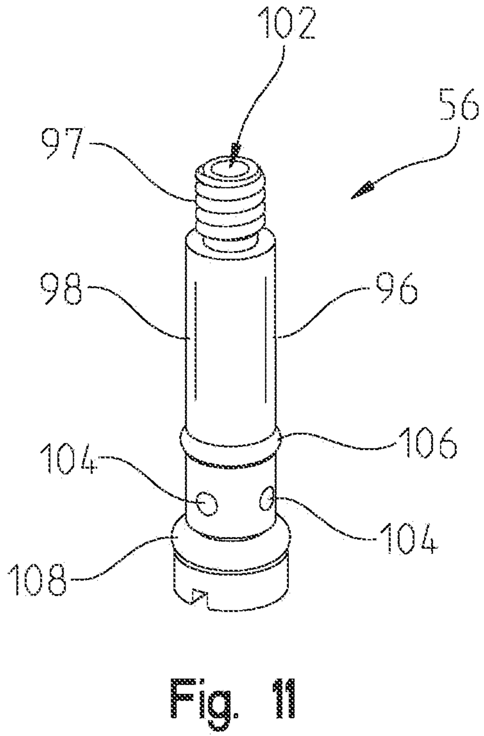
FIG. 11 is a perspective view of a valve shaft of the vessel rinsing apparatus of FIG. 2.

As shown in FIG. 9, a third removable trigger plate 58*c* may comprise an elastomeric brush 154 similar to that shown in FIG. 8. More particularly, the brush 154 includes a plurality of upwardly extending projections or bristles 156 and a plurality of drain openings 158 positioned intermediate adjacent cleaning projections 156.

Figure 13:
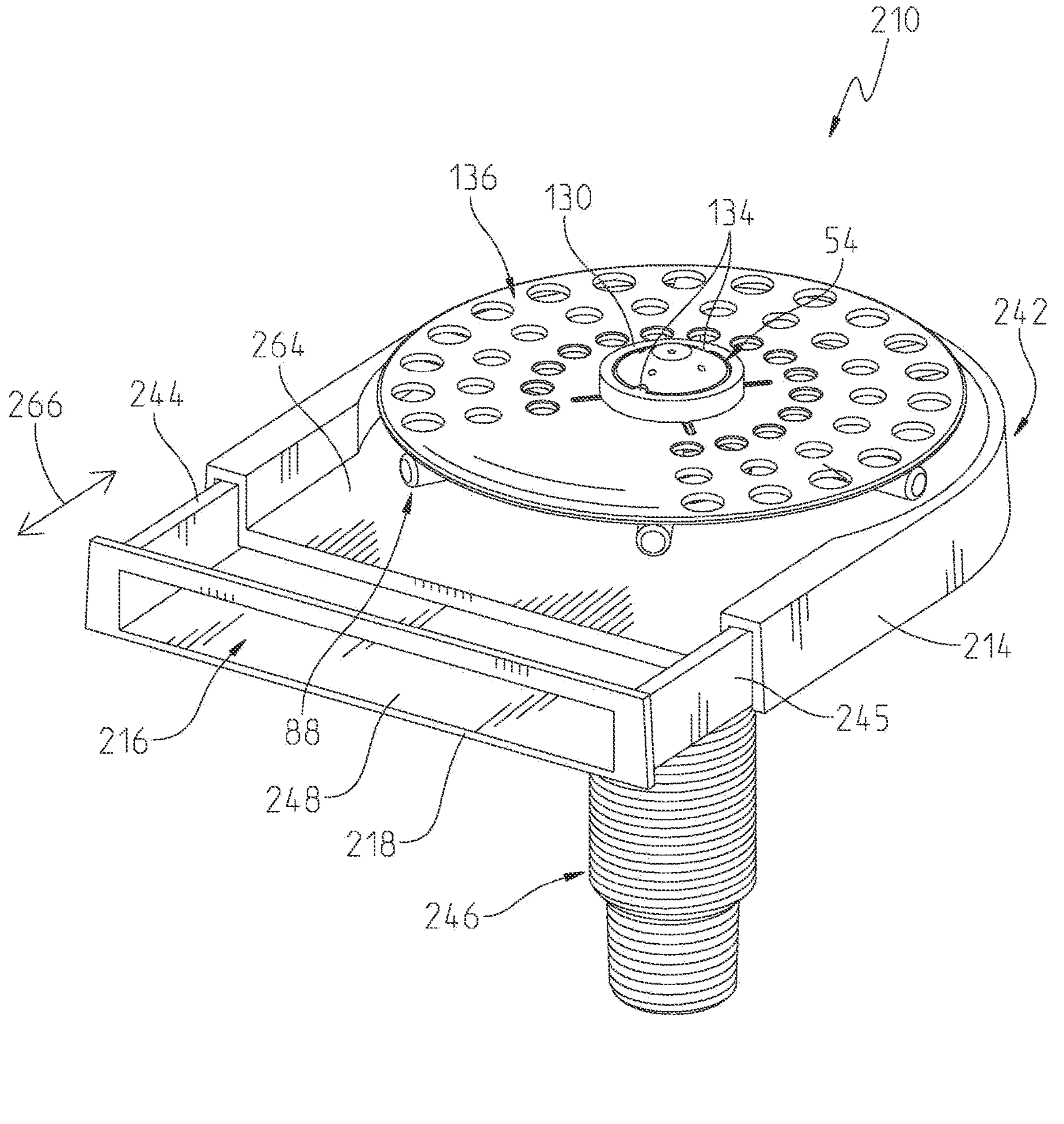
FIG. 13 is a perspective view of another illustrative embodiment vessel rinsing apparatus.

A further illustrative embodiment vessel rinsing apparatus 210 is shown in FIG. 13 as including many of the same elements as the vessel rinsing apparatus 10 detailed above. As such, in the following description, like components are identified with similar reference numbers. The drain channel 216 of the vessel rinsing apparatus 210 includes a movable tray 218 supported by the upper wall 214 of the escutcheon 242. Move particularly, the movable tray 218 includes opposing side walls 244, 245 supported by a lower wall 248. The side walls 244, 245 are slidably received within the upper wall 214 of the escutcheon 242, and the lower wall 248 is slidably received within the upper plate 264 of the mounting base 246. As such, the relative position of the drain channel 216 may be adjusted (as shown by arrows 266) to facilitate wastewater discharge into the sink basin 14. More particularly, the removable tray 218 accommodates different dimensions between the mounting aperture 44*c* and the sink basin 14.

Figure 14:
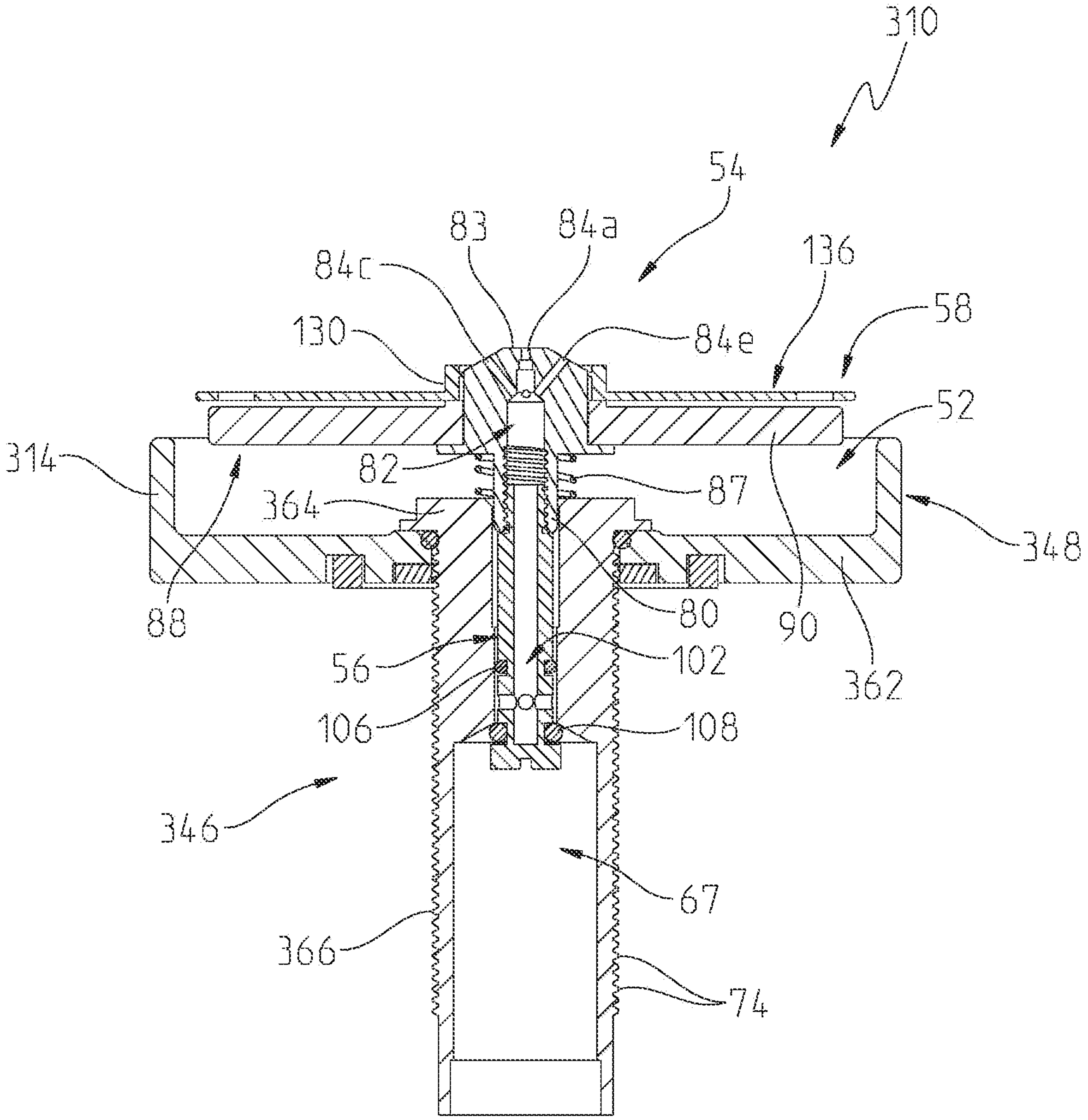
FIG. 14 is a cross-sectional view similar to FIG. 5 of a further illustrative embodiment vessel rinsing apparatus.

Another illustrative embodiment vessel rinsing apparatus 310 is shown in FIG. 14 as including many of the same elements as the vessel rinsing apparatus 10 detailed above. As such, in the following description, like components are identified with similar reference numbers. The vessel rinsing apparatus 310 includes a mounting base 346 including a mounting shank 366 and an upper coupler 364. The escutcheon 348 illustratively includes a lower wall 362 and an upwardly extending wall 314 defining the drain bowl 52.

Although the invention has been described in detail with reference to certain preferred embodiments, variations and modifications exist within the spirit and scope of the invention as described and defined in the following claims.

What is claimed is:

1. A drinkware rinsing apparatus configured to be installed on a mounting deck adjacent a sink basin, the rinsing apparatus comprising:

a hollow, cylindrical mounting shank extending along a longitudinal axis, the mounting shank defining a first fluid passageway and including a valve seat;

a valve at least partially disposed within the mounting shank, the valve having an open position and a closed position, the valve including a valve pin and a valve seal supported by the valve pin, the valve seal biased against the valve seat in the closed position;

a fluid discharge control including:

a central body extending along the longitudinal axis and at least partially disposed within the mounting shank, wherein the central body includes a second fluid passageway, and wherein the valve pin is coupled to the central body, a sprayface supported by a first end of the central body and including at least one outlet in fluid communication with the second fluid passageway, a trigger operably coupled to the central body, the trigger moveable between a lowered position and a raised position, wherein the trigger is biased toward the raised position, wherein moving the trigger to the lowered position is configured to move the valve pin such that the valve seal moves away from the valve seat causing the valve to be in the open position, and wherein in the open position, the first fluid passageway of the mounting shank is in fluid communication with the second fluid passageway of the central body and the at least one outlet of the sprayface;

a drain bowl operably coupled to the mounting shank, the drain bowl defined by a base and an upwardly extending wall;

a drain channel extending through the upwardly extending wall; and wherein in an installed condition of the rinsing apparatus, the drain bowl is positioned above the mounting deck, at least a portion of the drain channel is positioned above the sink basin, and the drain channel is configured to receive fluid from the drain bowl and discharge the fluid above and into the sink basin.

2. The rinsing apparatus of claim 1, wherein:

the valve pin defines a third fluid passageway; and fluid is configured to flow from the first fluid passageway of the mounting shank to the second fluid passageway of the central body through the third fluid passageway of the valve pin when the valve is in the open position.

3. The rinsing apparatus of claim 1, wherein the central body of the fluid discharge control is positioned intermediate the sprayface and the valve seat.

4. The rinsing apparatus of claim 1, wherein in the installed condition of the rinsing apparatus, the drain channel is inclined downwardly toward the sink basin.

5. The rinsing apparatus of claim 1, wherein the sprayface of the fluid discharge control is located substantially within the drain bowl.

6. The rinsing apparatus of claim 1, wherein the at least one outlet of the sprayface includes a first outlet configured to discharge fluid at a first angle relative to the longitudinal axis, and a second outlet configured to discharge fluid at a second angle relative to the longitudinal axis.

7. The rinsing apparatus of claim 1, wherein the base of the drain bowl includes an opening through which at least a portion of the mounting shank extends.

8. The rinsing apparatus of claim 1, wherein the fluid discharge control is in selective fluid communication with an outlet of a faucet mixing valve.

9. The rinsing apparatus of claim 8, further comprising a diverter valve fluidly coupled intermediate the outlet of the faucet mixing valve and the fluid discharge control.

10. The rinsing apparatus of claim 1, wherein the trigger of the fluid discharge control includes a plurality of arms extending radially outwardly from the central body.

11. The rinsing apparatus of claim 1, further comprising a spring operable to bias the trigger toward the raised position.

12. A drinkware rinsing apparatus configured to be installed on a mounting deck adjacent a sink basin, the rinsing apparatus comprising:

a hollow, cylindrical mounting shank extending along a longitudinal axis, the mounting shank defining a first fluid passageway and including a valve seat;

a valve at least partially disposed within the mounting shank, the valve having an open position and a closed position, the valve including a valve pin and a valve seal supported by the valve pin, the valve seal biased against the valve seat in the closed position;

a fluid discharge control including:

a central body extending along the longitudinal axis and at least partially disposed within the mounting shank, wherein the central body includes a second fluid passageway, a sprayface supported by a first end of the central body and including at least one outlet in fluid communication with the second fluid passageway, and a depressible trigger operably coupled to the central body, the trigger moveable between a rest position and a depressed position;

a drain bowl operably coupled to the mounting shank, the drain bowl defined by a base and an upwardly extending wall;

a drain channel extending through the upwardly extending wall; and wherein in the installed condition of the rinsing apparatus, the drain bowl is positioned above the mounting deck, at least a portion of the drain channel is positioned above, and inclined downwardly toward, the sink basin, and the drain channel is configured to receive fluid from the drain bowl and discharge fluid above and into the sink basin.

13. The rinsing apparatus of claim 12, wherein:

the trigger is biased toward the rest position;

depressing the trigger is configured to move the valve pin such that the valve seal moves away from the valve seat causing the valve to be in the open position; and in the open position, the first fluid passageway of the mounting shank is in fluid communication with the second fluid passageway of the central body and the at least one outlet of the sprayface.

14. The rinsing apparatus of claim 12, wherein:

the valve pin defines a third fluid passageway; and fluid is configured to flow from the first fluid passageway of the mounting shank to the second fluid passageway of the central body through the third fluid passageway of the valve pin when the valve is in the open position.

15. The rinsing apparatus of claim 12, wherein the central body of the fluid discharge control is positioned intermediate the sprayface and the valve seat.

16. The rinsing apparatus of claim 12, wherein the at least one outlet of the sprayface includes a first outlet configured to discharge fluid at a first angle relative to the longitudinal axis, and a second outlet configured to discharge fluid at a second angle relative to the longitudinal axis.

17. The rinsing apparatus of claim 16, wherein the at least one outlet of the sprayface further includes a third outlet configured to discharge fluid at a third angle relative to the longitudinal axis.

18. The rinsing apparatus of claim 12, wherein the sprayface of the fluid discharge control is located substantially within the drain bowl.

19. The rinsing apparatus of claim 12, wherein the base of the drain bowl includes an opening through which at least a portion of the mounting shank extends.

20. The rinsing apparatus of claim 12, wherein the fluid discharge control is in selective fluid communication with an outlet of a faucet mixing valve.

21. The rinsing apparatus of claim 20, further comprising a diverter valve fluidly coupled intermediate the outlet of the faucet mixing valve and the fluid discharge member.

22. The rinsing apparatus of claim 12, wherein the trigger of the fluid discharge control includes a plurality of arms extending radially outwardly from the central body.

23. The rinsing apparatus of claim 12, further comprising a spring operable to bias the trigger toward the rest position.

24. A drinkware rinsing apparatus configured to be installed on a mounting deck adjacent a sink basin, the rinsing apparatus comprising:

- a hollow, cylindrical mounting shank extending along a longitudinal axis, the mounting shank defining a first fluid passageway and including a valve seat;
- a valve at least partially disposed within the mounting shank, the valve having an open position and a closed position, the valve including a valve pin and a valve seal supported by the valve pin, the valve seal biased against the valve seat in the closed position;
- a fluid discharge control including:
  - a central body extending along the longitudinal axis and at least partially disposed within the mounting shank, wherein the central body includes a second fluid passageway,
  - a sprayface supported by a first end of the central body and including a plurality of outlets in fluid communication with the second fluid passageway,
  - wherein the plurality of outlets include a first outlet configured to discharge fluid at a first angle relative to the longitudinal axis, a second outlet configured to discharge fluid at a second angle relative to the longitudinal axis, and a third outlet configured to discharge fluid at a third angle relative to the longitudinal axis,
  - a depressible trigger operably coupled to the central body, the trigger moveable between a lowered position and a raised position,
  - wherein the trigger is biased toward the raised position,
  - wherein depressing the trigger to the lowered position is configured to move the valve pin such that the valve seal moves away from the valve seat causing the valve to be in the open position; and
  - wherein in the open position, the first fluid passageway of the mounting shank is in fluid communication with the second fluid passageway of the central body and the outlets of the sprayface;
- a drain bowl operably coupled to the mounting shank, the drain bowl defined by a base and an upwardly extending wall;
- a drain channel extending through the upwardly extending wall; and
- wherein in an installed condition of the rinsing apparatus, the drain bowl is positioned above the mounting deck, at least a portion of the drain channel is positioned above the sink basin, and the drain channel is configured to receive fluid from the drain bowl and discharge the fluid above and into the sink basin.

25. The rinsing apparatus of claim 24, wherein the base of the drain bowl includes an opening through which at least a portion of the mounting shank extends.

26. The vessel rinsing apparatus of claim 24, wherein the trigger of the fluid discharge control includes a plurality of arms extending radially outwardly from the central body.

27. A vessel rinsing apparatus configured to be installed on a mounting deck adjacent a sink basin, the vessel rinsing apparatus comprising:

- a drain bowl including an upwardly extending wall and a base coupled to a mounting shank defining a longitudinal axis;
- wherein the mounting shank is configured to extend though a mounting aperture formed within a mounting deck;
- a fluid discharge control including a central body supporting a sprayface having a plurality of nozzles, and a trigger, the central body being movable relative to the mounting shank along the longitudinal axis;
- a valve operably coupled to the fluid discharge control for movement between a normally closed position and an open position, the valve including a valve seal configured to cooperate with a valve seat supported by the mounting shank;
- wherein in the open position of the valve, the mounting shank is in fluid communication with the plurality of nozzles of the fluid discharge control via the valve;
- a drain channel extending through the upwardly extending wall of the drain bowl and including a channel lower wall extending outwardly relative to the longitudinal axis; and
- wherein in an installed condition of the rinsing apparatus, the drain bowl is positioned above the mounting deck, at least a portion of the channel lower wall of the drain channel is positioned above the sink basin, and the drain channel is configured to receive fluid from the drain bowl and discharge the fluid above and into the sink basin.

28. The vessel rinsing apparatus of claim 27, wherein the drain channel further includes first and second opposing channel side walls, each extending upwardly from the channel lower wall.

29. The rinsing apparatus of claim 27, wherein the valve includes a valve pin coupled to the central body of the fluid discharge control and supporting the valve seal, the valve seal biased against the valve seat of the mounting shank in the normally closed position.

30. The rinsing apparatus of claim 29, further comprising a spring operable to bias the valve seal toward the normally closed position, wherein the valve seal is disposed on a first side of the valve seat, and the spring is disposed on a second side of the valve seat.

* * * * *